United States Patent [19]

George

[11] Patent Number: 4,590,990
[45] Date of Patent: May 27, 1986

[54] VENTILATION HEAT RECOVERY SYSTEM

[76] Inventor: John A. George, R.R. 1, Uniontown, Kans. 66779

[21] Appl. No.: 664,757

[22] Filed: Oct. 25, 1984

[51] Int. Cl.⁴ .......................... F24H 3/02; F24F 7/08; F24F 13/06
[52] U.S. Cl. ....................................... 165/54; 165/95; 165/909; 165/921; 98/33.1; 98/40.19
[58] Field of Search .......... 165/54, DIG. 2, DIG. 12, 165/921, 95; 98/40.19, 33.1; 34/86

[56] References Cited

U.S. PATENT DOCUMENTS

| | | | |
|---|---|---|---|
| 2,488,333 | 11/1949 | Schlachter | 165/54 |
| 3,381,747 | 5/1968 | Darm | 165/166 |
| 3,581,649 | 6/1971 | Rauenhorst | 165/909 |
| 4,034,482 | 7/1977 | Briscoe | 34/86 |
| 4,184,538 | 1/1980 | Rauenhorst | 165/909 |
| 4,330,082 | 5/1982 | Wilson | 98/33.1 |
| 4,334,577 | 6/1982 | George | 165/54 |
| 4,348,818 | 9/1982 | Brown | 34/86 |
| 4,497,362 | 2/1985 | Teague, Jr. | 165/DIG. 12 |
| 4,512,393 | 4/1985 | Maendel | 165/54 |

FOREIGN PATENT DOCUMENTS

| | | | |
|---|---|---|---|
| 2360068 | 10/1975 | Fed. Rep. of Germany | 165/54 |
| 3017431 | 11/1981 | Fed. Rep. of Germany | 165/54 |
| 935841 | 7/1948 | France | 165/54 |
| 358182 | 4/1938 | Italy | 165/54 |
| 43122 | 9/1958 | Poland | 165/54 |
| 1026986 | 4/1966 | United Kingdom | 98/40.19 |

Primary Examiner—William R. Cline
Assistant Examiner—John K. Ford
Attorney, Agent, or Firm—Litman, Day and McMahon

[57] ABSTRACT

A ventilation heat recovery system is mounted in a livestock building or the like. The system includes a counterflow shell and tube heat exchanger with an outer sleeve axially surrounding the shell along a substantial longitudinal portion thereof. Air is drawn from the ambient atmosphere into the shell for heat-exchanging flow counter to exhaust air that is drawn from the building atmosphere and forced through the exchanger tubes for exhausting to the ambient atmosphere. An annular-shaped distribution channel is formed between the outer sleeve and the shell, and the sleeve has a plurality of distribution orifices therealong for distributing incoming air to the building atmosphere. The channel is in flow communication with the shell through a transition zone defined between the end of the shell and a transition manifold which supports the tubes. Alternatively, the shell is in flow communication with a remote distribution duct having a plurality of distribution orifices.

1 Claim, 7 Drawing Figures

U.S. Patent  May 27, 1986  Sheet 2 of 2  4,590,990
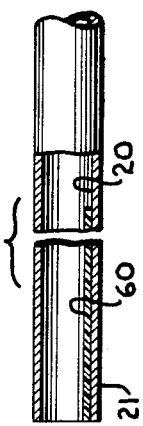
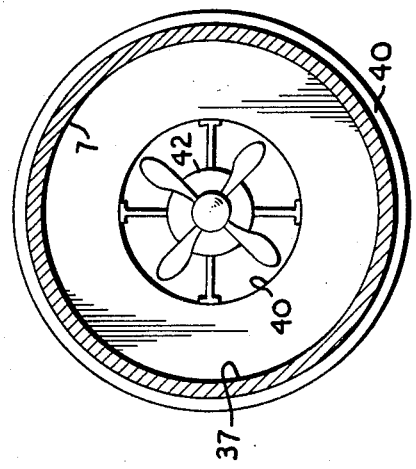
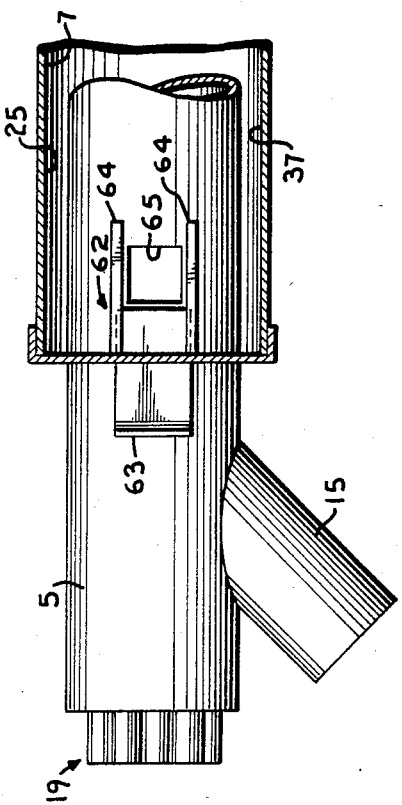
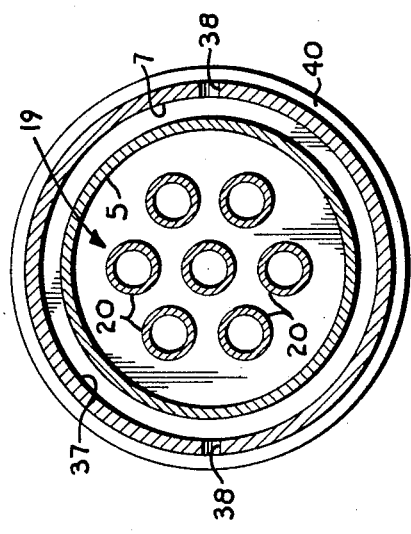
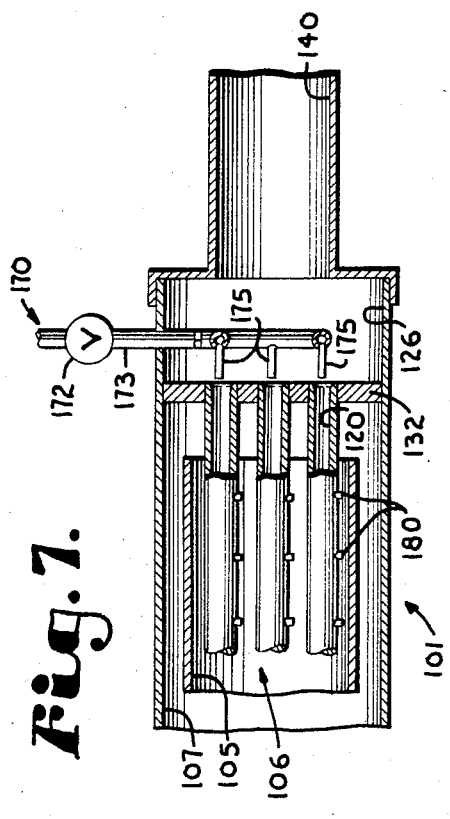

VENTILATION HEAT RECOVERY SYSTEM

BACKGROUND OF THE INVENTION

This invention relates to heat exchangers in general and particularly to heat exchangers for ventilating livestock buildings.

Various types of heat exchangers have been developed and utilized in livestock buildings for the purpose of recovering heat from exhausted stale ventilation air and utilizing it to heat incoming fresh ventilation air. Many livestock buildings, particularly those in which farm animals are intensively housed, require constant ventilation to remove moisture, manure odors and gases and gaseous by-products of respiration. Such ventilation is required under the coldest of temperature extremes. It is necessary to heat incoming cold air to maintain acceptable building temperatures for animal growth and comfort. Thus, various heat-exchanging configurations have been developed for the purposes stated above.

Many of these units use a flat plate heat exchange surface with stale air passing on one side and fresh air passing on the other. Various configurations of parallel flow, crossflow, counterflow and reciprocating flow have been used. Typically, the space devoted to such ventilation systems is limited and efforts have been undertaken to minimize the size of these ventilation systems.

Failure to adequately control inlet conditions can result in undesirable drafts on the livestock and condensation on environmental surfaces, leading to poor health and potentially to building deterioration. Good ventilation typically requires the uniform placement and proper adjustment of inlets around the room to be ventilated. They are often mounted on a wall on the outside of a wall or in the ceiling or attic of the building. Control over inlet air velocity usually requires reliance on fans to provide static pressure to induce air movement. Further, it is important to provide uniform distribution of the air throughout the room. However, many existing heat exchangers do not adequately provide for air distribution throughout the room.

In livestock buildings, humidities high enough to cause condensation on the cold heat transfer surfaces are not uncommon. Although the condensation tends to increase heat transfer, it also attracts and traps airborne dust and other materials commonly contained in the air streams. The collected material tends to coat the heat exchange surfaces and, if not properly cleaned, can seriously reduce heat exchange rates. Many existing systems have close spacing between heat exchange surfaces in order to provide sufficient heat exchange area to result in acceptable exchange efficiency. This close spacing increases the likelihood of heat exchanger blinding and makes it more difficult to clean the exchanger surfaces. Furthermore, during times of cold weather, the condensate tends to freeze, thus hindering air flow and heat transfer. Previous attempts to alleviate these problems have not been entirely successful.

It is desirable to use the ductwork of a heat recovery system for velocity cooling during hot weather. The exhaust air fan of the system is turned off when larger summer exhaust fans, which move more air, are in use. Relatively high velocity airstreams can be supplied to animal spaces through the distribution duct or optional extension ducts or drop pipes to individual animal pens. Accordingly, there is no need for heat recovery and thus no need for the counter flow relationship of the incoming and outgoing air. It is desirable to provide a system in which the counter flow section is by-passed and incoming air flows directly to the distribution duct and the like for velocity cooling.

Thus, it is desirable to provide a versatile ventilation heat recovery system which utilizes efficient counterflow heat exchanger geometry. It is also generally desirable to provide a system which is relatively easy to clean and otherwise maintain and is not susceptible to scaling or blinding.

OBJECTS OF THE INVENTION

The principal objects of the present invention are: to provide a ventilation heat recovery system to ventilate a livestock building or the like; to provide such a system which utilizes a counterflow heat exchanger geometry to recover heat from exhausted air to preheat incoming air; to provide such a system which provides uniform distribution of ventilation air; to provide such a system which is versatile in design and may be used solely as a ventilation system; to provide such a system which is relatively simple in design and easy to maintain; to provide such a system which uniformly distributes air to the building; to provide such a system which removes air from the building at a source remote from air distribution points; to provide such a system which has an outer insulating sleeve; and to provide such a system which is relatively simple to use, economical to manufacture, and particularly well adapted for the proposed usage thereof.

Other objects and advantages of this invention will become apparent from the following description taken in conjunction with the accompanying drawings wherein are set forth, by way of illustration and example, certain embodiments of this invention.

SUMMARY OF THE INVENTION

A ventilation heat recovery system is provided for use with a livestock building or the like. The system comprises an inlet air duct, an outlet air duct, and a distribution duct adapted to be mounted to a wall and ceiling of the building. The ducts and sleeves are made from a heat conductive material such as aluminum or the like. It is also envisioned that the inlet and distribution ducts may be made from a material such as polyvinyl chloride and the outlet duct from aluminum.

The inlet air duct is preferably a substantially circular, elongate heat-exchanging shell, which has a first end situated outside the building. The inlet duct first end is open to the ambient atmosphere surrounding the building and is in flow communication therewith for providing fresh air to the building. A second end of the inlet duct is located within the building and opens into the outer sleeve.

Preferably, the inlet duct first end includes a Y-branch duct which is obliquely angled relative to a longitudinal axis of the inlet duct. The branch duct is open to the ambient atmosphere and includes means for inducing a flow of air into the inlet duct. The flow induction means preferably comprise a motorized fan.

The outlet air duct preferably comprises a tube bundle having a plurality of individual tubes. The tube bundle is situated within the inlet duct in a heat-exchanging relationship therewith. A first end of the tube bundle extends from the inlet duct first end into the ambient atmosphere. Preferably, the branch duct is included so that the air induction means, e.g. the fan, are located remote from the first end of the tube bundle, from which exhaust gases are expelled. In that case, the outer end of the longitudinal portion of the inlet duct is equipped with a sealing cap having a plurality of orifices through which the tube bundle tubes extend. A second end of the tube bundle extends into the building.

The distribution duct is preferably an outer sleeve located within the building and axially surrounds the inlet and outlet ducts. A first end of the sleeve is located adjacent the building wall through which the inlet duct extends. The sleeve has a second end which extends substantially further into the building than does the inlet duct. An annular-shaped distribution channel is formed between the inlet duct and the outer sleeve; the distribution channel is in flow communication with the inlet duct. The outer sleeve is provided with a plurality of distribution orifices which provide flow communication between the distribution channel and the building atmosphere.

A transition manifold, such as a stationary tube sheet, is situated in the outer sleeve near the inlet duct second end, but spaced therefrom so as to define a transition zone between the inlet duct second end and the transition manifold. The second ends of the tubes of the tube bundle extend through respective orifices in the transition manifold such that the tube second ends are not in direct flow communication with the inlet duct second end, due to separation by the transition manifold. The transition zone defines a location at which the direction of flow of incoming air in the inlet duct reverses and counterflows into the distribution channel and through the distribution orifices.

The tube second ends preferably terminate at the transition manifold and are in flow communication with exhaust air coming from a reduction member attached to the outer sleeve second end and in flow communication with the building atmosphere. Preferably, flow induction means, such as a motorized fan, are situated in the reduction member and force fouled air from the building into the outer sleeve second end and then into the individual tubes in counterflow relationship with the incoming air of the inlet duct. The exhausted air flows down the tubes in heat-exchanging relationship with the incoming air and exhausts into the ambient atmosphere. The reduction member is generally spaced remote from the distribution orifices so that fresh air is circulated throughout the room before being presented to the flow induction means for exhaustion.

Many livestock buildings are equipped with an excretion pit for receiving urine and feces from the housed livestock. Noxious gasses are formed in the pit as the excretion ferments. In order to more efficiently remove these warm and odoriferous gasses, an elongate pit duct may be mounted in the excretion pit. The pit duct has a plurality of orifices therein to provide flow communication between the duct and the pit. Further, one end of the pit duct is connected to appropriate duct work to provide flow communication from the pit duct to the reduction member of the ventilation heat recovery system. The fan then provides a suction to induce air movement from the pit through the ductwork and into the tube bundle. This configuration provides relatively greater heat exchanging efficiency, as it removes the warm, noxious gasses directly from the excretion pit. This design also ensures good separation of the exhaust pickup point and the inlet distribution points.

A common problem during cold weather is freezing of condensation within the heat exchanger and the concommitant reduction in efficiency and air distribution capacity. One solution to this problem is the provision of pipe insulation in a bottom portion of each tube. An appropriate insulation material can be fitted in each of the tubes from the first end and extending slightly into the building for a sufficient distance to a point where there is little chance of freezing. This distance is determined empirically. The insulation will reduce the heat transfer rate, thus reducing the chance of the condensate freezing before it escapes from the first end of the tubes.

An alternate approach to the condensation problem is to remove the condensate from the tube near the point of condensation and before it reaches a zone in the tube where freezing temperatures are prevalent. A series of small outlet tubes drain the condensation from the tube bundle tubes into the inlet duct and is subsequently removed therefrom.

The system may be provided with a washer manifold to be utilized in severe duty applications where dust levels are high and the self-cleaning action of the condensation within the heat exchanger tubes is not adequate to keep the tubes clear. The washer manifold comprises a water line with an appropriate valve. The water line extends into the transition zone and has a plurality of washer nozzles, one for each heat exchanger tube. Water is selectively sprayed into the tubes through the washer nozzles and washes out excess dust and like contaminants, either through the outlet tubes or the end of the tube bundle tubes.

During warm weather conditions, the heat exchanger is not needed, and often large exhaust fans are in use. Thus, the exhaust fan of the heat exchanger is not necessary. However, it is preferable to provide fresh air distribution within the livestock building throughout the year. A fresh air by-pass may be provided to force fresh air directly from the heat exchanger shell first end into the distribution channel for distribution into the livestock building. The by-pass comprises a sliding gate which selectively opens and closes an aperture in the heat exchanger shell. When in the open position, fresh air can pass directly into the distribution channel at the shell first end, instead of passing down the entire length of the shell and then into the distribution channel. Because the path of a substantial portion of air is shorter, the load on the inlet fan is reduced, thus allowing substantially higher air flow rates. Additionally, individual cooling tubes may extend from the heat exchanger sleeve to an individual farrowing crate or the like for more direct cooling.

It is also envisioned that the present system may be produced without the outer sleeve. That is, a separate distribution duct system may alternatively be in flow communication with the fresh air flowing in the exchanger shell. The separate distribution duct extends generally longitudinally of the heat exchanger, but is horizontally spaced therefrom.

The drawings constitute a part of this specification and include exemplary embodiments of the present invention and illustrate various objects and features thereof.

BRIEF DESCRIPTION OF THE DRAWINGS

FIG. 3 is an enlarged cross-sectional view of the system taken along line 3—3, FIG. 2.

FIG. 4 is an enlarged cross-sectional view of the system taken along line 4—4, FIG. 2.

FIG. 5 is an enlarged, fragmentary side elevational view of a heat exchanging tube of the system shown with insulation material therein.

FIG. 6 is an enlarged, fragmentary side elevational view of the system showing a by-pass configuration.

FIG. 7 is a fragmentary side elevational view of a modified system showing a washer manifold and a plurality of tube drain pipes.

DETAILED DESCRIPTION OF THE INVENTION

Figure 1:
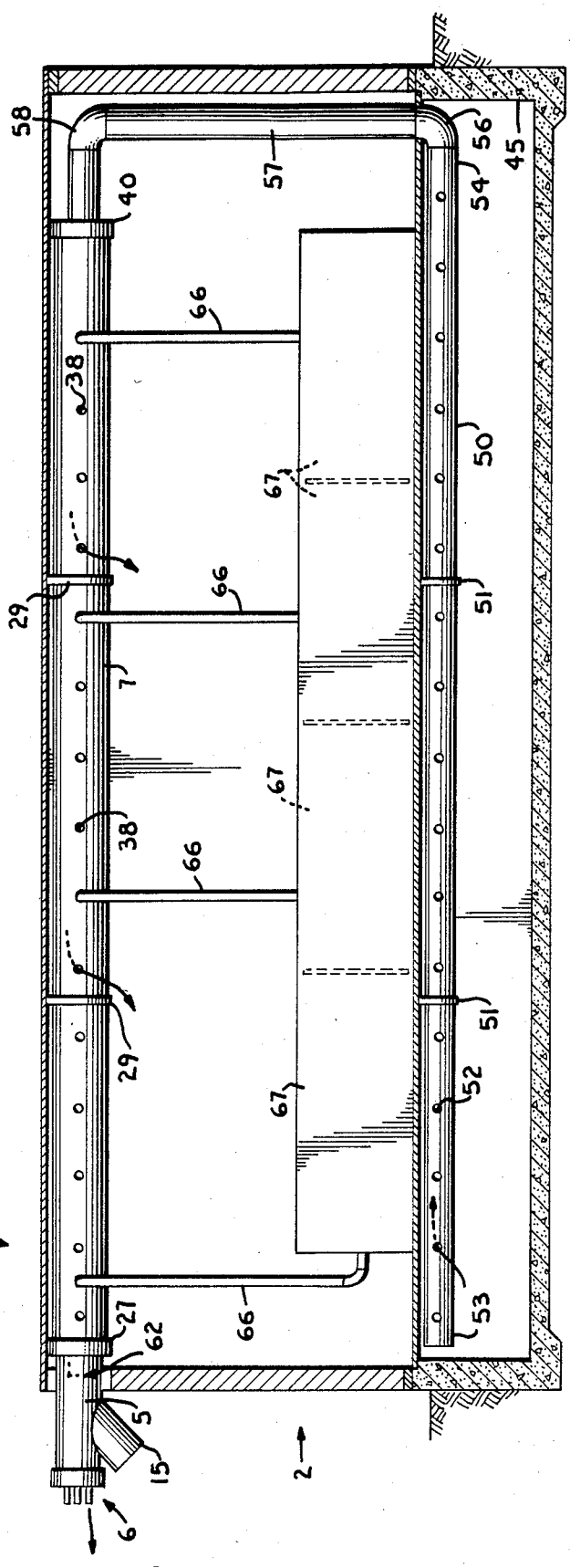
FIG. 1 is a fragmentary side elevational view of a ventilation heat recovery system shown mounted in a livestock building with a pit exhaust duct mounted in association therewith.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally indicates a ventilation heat recovery system according to the present invention. The system 1 is adapted to be mounted in a livestock building 2 or the like and includes an inlet air duct or shell 5, an outlet air duct 6 and a distribution duct, such as an outer sleeve 7.

The shell 5 is substantially circular in cross section and extends through an opening 9 in the building 2. The opening 9 is sized to sealably receive the shell 5 such that a first end 10 of the shell is situated outside of the building 2 and a second end 11 is situated within the building 2.

The shell first end 10 is open to the ambient atmosphere surrounding the building and is in flow communication therewith for providing fresh air to the building interior. As illustrated, the outermost section of the shell first end 10 has a shell cap 14 attached thereto, thereby sealing the outermost section of the first end 10 from flow communication with the ambient atmosphere. The shell first end 10 includes a Y-branch duct 15 which is obliquely angled relative to a central longitudinal axis of the shell 5. The branch duct 15 is integral with the shell 5 and opens at one end thereinto, in addition to being open at an opposite end to the ambient atmosphere. Flow induction means, such as a motorized fan 17, are located in the branch duct 15 for forcing air into the shell 5 for eventual distribution into the building interior.

Figure 2:
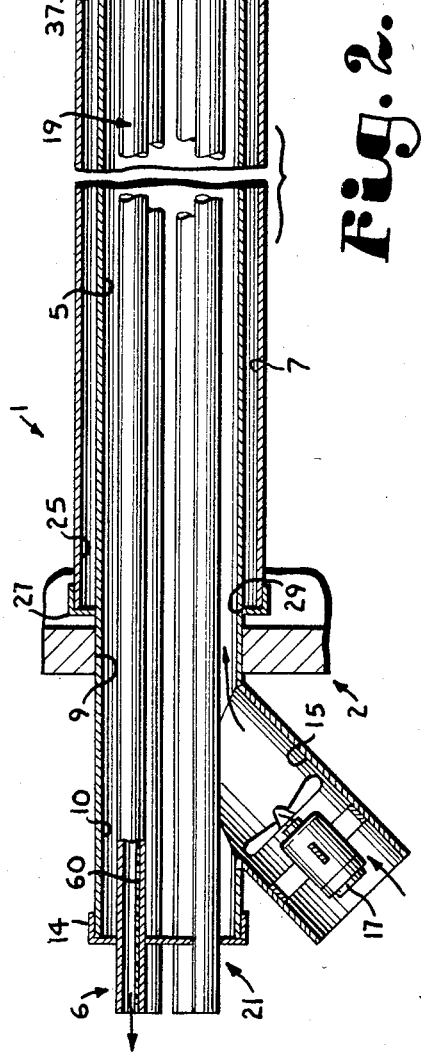
FIG. 2 is a fragmentary, enlarged side elevational view of the system with portions broken away to show interior detail.

As illustrated, the outlet air duct 6 comprises a tube bundle 19 having a plurality of individual elongate tubes 20 situated within the shell 5 in heat-exchanging relationship therewith. The shell cap 14 is provided with a plurality of openings corresponding to the tubes 20, thereby allowing a first end 21 of the tube bundle 19 to extend into the ambient atmosphere. A second end 22 of the tube bundle 19 extends into the building slightly further than does the shell second end 11, as best illustrated in FIG. 2.

The tube bundle first end 21 is located remote from the Y-branch duct 15, so as to separate the air induction means, i.e. the fan 17, from the exhaust gasses that are expelled from the tube bundle second end 22.

As illustrated in FIG. 3, the tubes 20 of the tube bundle 19 are arranged in a circular pattern relative to a longitudinal axis of the inlet duct or shell 5 and spaced from an inner surface 23 thereof, with a central tube 20 being axially aligned with the inlet duct. This configuration efficiently locates 7 tubes 20 within the shell 5 and exposes the entire circumferential area of the tubes 20 to air flowing in the shell 5 from the branch duct 15.

The outer sleeve 7 is situated totally within the building 2 and axially surrounds both the inlet and outlet air ducts 5 and 6. A first end 25 of the outer sleeve 7 is located adjacent a wall of the livestock building 2 and a second end 26 thereof extends into the building interior. As seen in FIG. 2, a sleeve cap 27 seals the outer sleeve first end 25 and snugly fits around the shell 5, which extends through an aperture 28 in the sleeve cap 27. The sleeve cap 27 is attached to the outer sleeve 7 so as to fix the sleeve 7 relative to the shell 5. As seen in FIG. 1, spaced supports 29 are used to mount the system to the building ceiling.

A transition manifold, such as a stationary tube sheet 32, is received in the outer sleeve 7 near the second end 26 thereof. The tube sheet 32 seals the sleeve 7 and defines a transition zone 33, which is in flow communication with the shell 5. The tube sheet 32 is provided with a plurality of openings 34, which receive respective tube bundle second ends 22. As seen in FIG. 2, the tube sheet 32 separates the openings of the tube bundle second end 22 from the shell second end 11.

A distribution channel 37 is defined between the shell 5 and the sleeve 7. The channel 37 is in flow communication with the transition zone 33 and the shell 5, as illustrated in FIG. 2. The sleeve 7 is provided with a plurality of regularly spaced distribution orifices 38 that are open to the building atmosphere, thereby providing flow communication between the channel 37 and the building atmosphere.

The tube bundle second end 22 terminates at the tube sheet 32 and is in flow communication with exhaust air flowing through a reduction member 40. The reduction member 40 is sealably attached to the outer sleeve second end 26 and is open to the building atmosphere at a location generally remote from the distribution orifices 38. As described below, the reduction member 40 may be attached to a system utilized to remove gasses from an excretion pit 41. Flow induction means, such as a second fan 42, are situated in the reduction member 40 and force foul, stale air from the building into the tube bundle 19 for expulsion to the ambient atmosphere.

As illustrated in FIG. 1, the livestock building 2 may be equipped with an excretion pit 45, as is widely known in the field. The pit 45 is located beneath a floor 46 of the building 2; the floor 46 comprises metallic grating, which allows animal excretions to fall into the pit 45. A pit exhaust duct 50 extends along the length of the pit 45 and hangs by supports 51 from the floor 46. The duct 50 has a plurality of pit orifices 52, which provide flow communication from the pit 45 into the pit duct 50. One end 53 of the pit duct 50 is sealed, while the other end 54 is open to a lower end 56 of a connecting duct 57 which extends upwardly toward the reduction member 40. An upper end 58 of the connecting duct 47 is connected to the reduction member 40 and in direct flow communication therewith, thus providing flow communication from the pit 45 to the reduction member 40.

As illustrated in FIGS. 2 and 5, the tubes 20 are fitted with an insulating material 60 to reduce the rate of heat exchange along a portion of the length of the tubes 20 to reduce the amount of condensation within the tubes 20. The insulating material 60 is attached to an inner surface of the tubes 20 and generally extends from the tube bundle first ends 21 along the tubes 20 to a point just within the building 2. The material 60 covers approximately one fourth of the inner circumference of the tubes 20 and is centered along the bottom most portion thereof.

As seen in FIG. 6, the system 1 includes a fresh air by-pass system 62, which comprises a slide gate 63, a pair of slide gate guides 64, and a by-pass aperture 65 in the shell 5. The gate guides 64 are positioned on upper and lower sides of the aperture 65 and receive the slide gate 63. The slide gate 63 is selectively movable within the guides 64 to selectively allow or prohibit air to flow from the shell 5 into the distribution channel 37, without traversing the entire length of the shell 5 and the distribution channel 37. The by-pass system 62 is located near the sleeve cap 27 such that the gate 63 is operable from a position remote from the distribution channel 37, as seen in FIG. 6. A plurality of drop pipes 66 are provided and extend from appropriate openings in the outer sleeve 7 to a respective farrowing crate 67 or the like. The drop pipes 66 are used in conjunction with the by-pass system 62 for individual cooling of animals in the crates 67. Means for shutting off flow are provided so that the drop pipes 66 do not interfere with the ventilation heat recovery system when the building is being heated.

In use, if the building is to be heated, the by-pass system 62 is not utilized and the slide gate 63 is closed, as are the drop pipes 66. The fan 17 in the Y-branch duct 15 forces air from the ambient atmosphere into the shell 5 and the air flows down the length of the shell 5 into the transition zone 33, in heat-exchanging relationship with the tube bundle 19. As inlet air is flowing along the length of the shell 5, the second fan 42 is forcing air from the excretion pit 45 through the pit exhaust duct 50 and the connecting duct 57 into the reduction member 40. Alternatively, the connecting duct is not connected to the reduction member and stale air is drawn directly from the building atmosphere. The second fan 42 forces the stale air into the tube bundle second end 22, and the air flows down the various tubes 20, in counterflow heat-exchanging relationship with the air flowing in the shell 5. The stale air is expelled from the tube bundle first end and into the ambient atmosphere at a location remote from the branch duct 15. The air flowing from the shell 5 into the transition zone 33 is forced by the tube sheet 32 to reverse direction and flow along the distribution channel 37, as illustrated in FIG. 2. The air flowing along the distribution channel 37 is evenly distributed into the building 2 through the distribution orifices 38.

MODIFIED EMBODIMENT

A modified embodiment of a ventilation heat recovery system 101 is illustrated in FIG. 7, which system 101 is similar in certain features to system 1 of the embodiment of FIGS. 1 through 6. Numerals having similar last two digits are used with reference to the systems 1 and 101 for similar parts except for the numerals of the instant embodiment are preceded by the prefix "1". Thus, an inlet air duct or shell 105 is generally analogous to the shell 5 of the previous embodiment. In the example illustrated in FIG. 7, the shell 105 and an outlet air duct 106, outer sleeve 107, tube sheet 132 and reduction member 140 are substantially similar to the corresponding elements as initially described.

However, a washer manifold assembly 170 is included to remove accumulated dust and the like from individual tubes 120 of the outlet duct 106. The washer assembly 170 includes an appropriate water supply and a shut-off valve 172 located in a water line 173. A plurality of water nozzles 175 are connected to the water line 173 and are located in the sleeve 107, at a second end 126 thereof. Each nozzle 175 is associated with a respective tube 120.

As an alternative to the insulating material 60 described above, a plurality of internal drains 180 placed along the lengths of the tubes 120 for draining condensate from the tubes 120 prior to the condensate reaching a location where it is subject to freezing in the pipes, that is toward the outer end of the tubes 120.

In use, when an operator determines that excess dust or the like has accumulated in the tubes 120, the valve 172 is actuated to allow water to flow in the water line to the individual nozzles 175. Water is sprayed from the nozzles 175 into the respective tubes 120 and travels along the length of the tubes 120, carrying excess dust with it. A portion of this water will exit from the drains 180, but only in relatively small amounts. The valve 172 is shut when the operator determines that the tubes 120 are sufficiently clear.

The internal drains 180 are placed along the lengths of the tubes 120 and are relatively small in size. Condensate within the tubes 120 tends to flow toward the outer ends thereof and will flow into the drains 180 for draining to the shell 105, where freezing is not a major concern. Due to the small size of the drains 180, the counterflow relationship of the air in the tubes 120 and the shell 105 is not substantially affected.

It is also envisioned that the systems 1 and 101 could be manufactured with the outer sleeve or distribution duct being located remote from the shell 5, thus eliminating the distribution channel 37. In that case, the remote sleeve would connect directly to the by-pass aperture 65 to receive by-pass air for distribution throughout the building 2.

It is to be understood that while certain forms of the present invention have been illustrated and described herein, it is not to be limited to the specific forms or arrangement of parts described and shown.

What is claimed and desired to be secured by Letters Patent is as follows:

1. A ventilation heat recovery system for use in a livestock building or the like having surrounding walls, a floor, and ceiling; said system comprising:
   (a) an elongate inlet air duct being adapted to extend into the building and to be supported by the ceiling and the walls; said inlet duct being open at a first end to the ambient atmosphere;
   (b) an elongate outlet tube bundle extending longitudinally within said inlet duct; said tube bundle including a plurality of tubes arranged in a circular pattern relative to a longitudinal axis of said inlet duct and including a central tube being axially aligned with said inlet duct; said tube bundle being adapted to be open at a first end into the ambient atmosphere and at a second end to the atmosphere of the building;

(c) an outer sleeve being adapted to extend at a first end thereof from a building wall into the building and axially surrounding said inlet duct and said tube bundle within the building; said outer sleeve having a second end adapted to be opened to the atmosphere of the building; said outer sleeve having a plurality of air distribution orifices generally horizontally spaced along a substantial portion of a length of said outer sleeve;

(d) a stationary tube sheet being received in said outer sleeve near said second end thereof between said outer sleeve second end and said inlet duct second end; said tube sheet having a plurality of orifices through which said tubes extend near said tube bundle second end; said tube sheet defining a transition zone between said inlet duct second end and said tube sheet; said transition zone providing incoming air flow communication between said inlet duct and said outer sleeve and to said distribution orifices; said outer sleeve and inlet duct defining a distribution channel therebetween extending generally from said transition zone to said building wall;

(e) said inlet duct having a branch duct being integral therewith and open to said inlet duct and to the ambient atmosphere;

(f) a first fan being postioned in said branch duct for forcing air from the ambient atmosphere into said inlet duct in heat-exchanging relationship with said tube bundle, and to said transition zone and along said distribution annulus and through said distribution orifices;

(g) a reducing member being connected to said outer sleeve second end and defining an opening to the building atmosphere to provide flow communication between said outer sleeve and the building atmosphere; and (h) a second fan being positioned in said reducing member for forcing air from the building into said outer sleeve second end through said tube bundle tubes in heat-exchanging relationship with said inlet duct and into the ambient atmosphere.

* * * * *